United States Patent Office 3,498,718
Patented Mar. 3, 1970

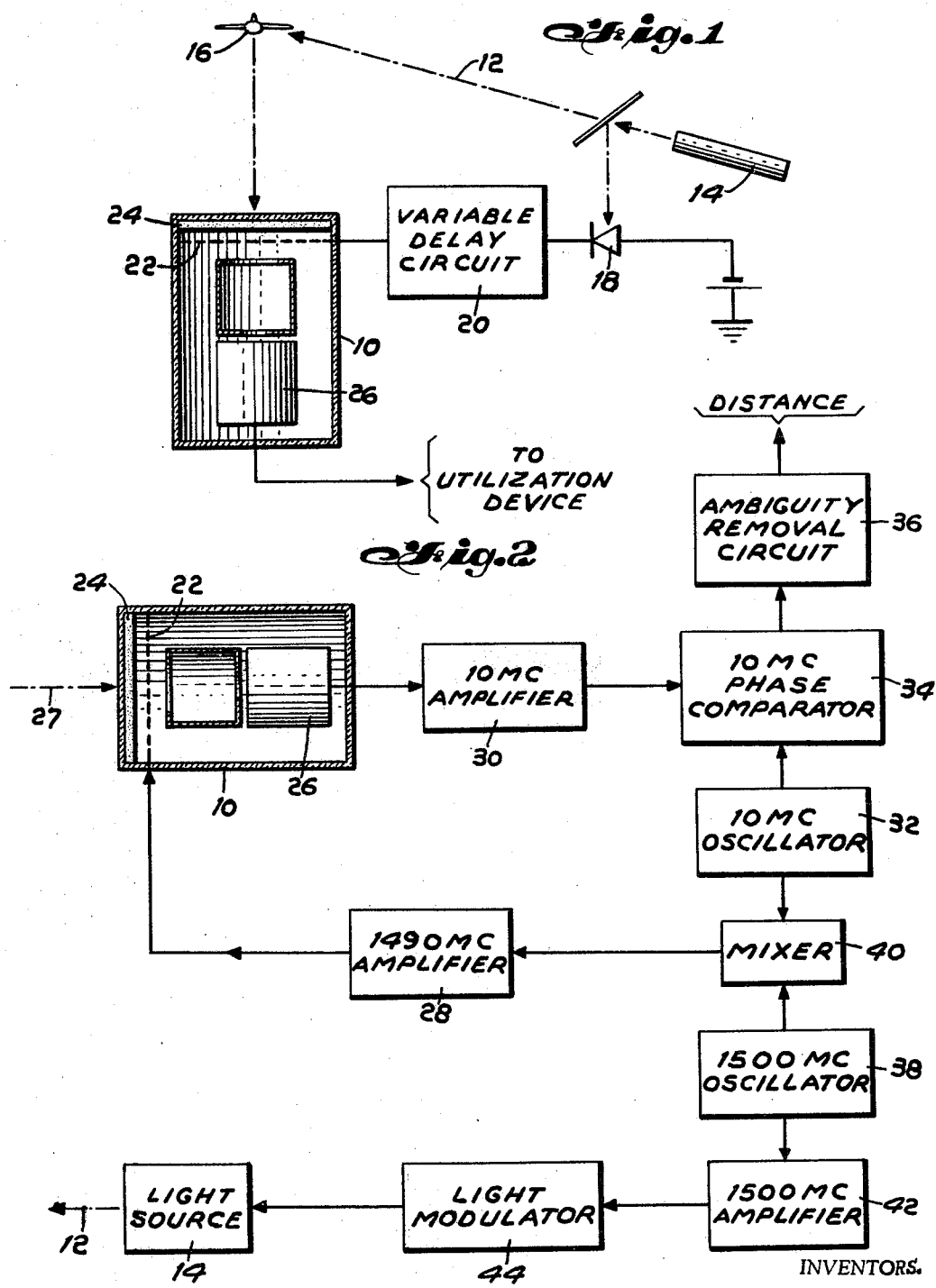

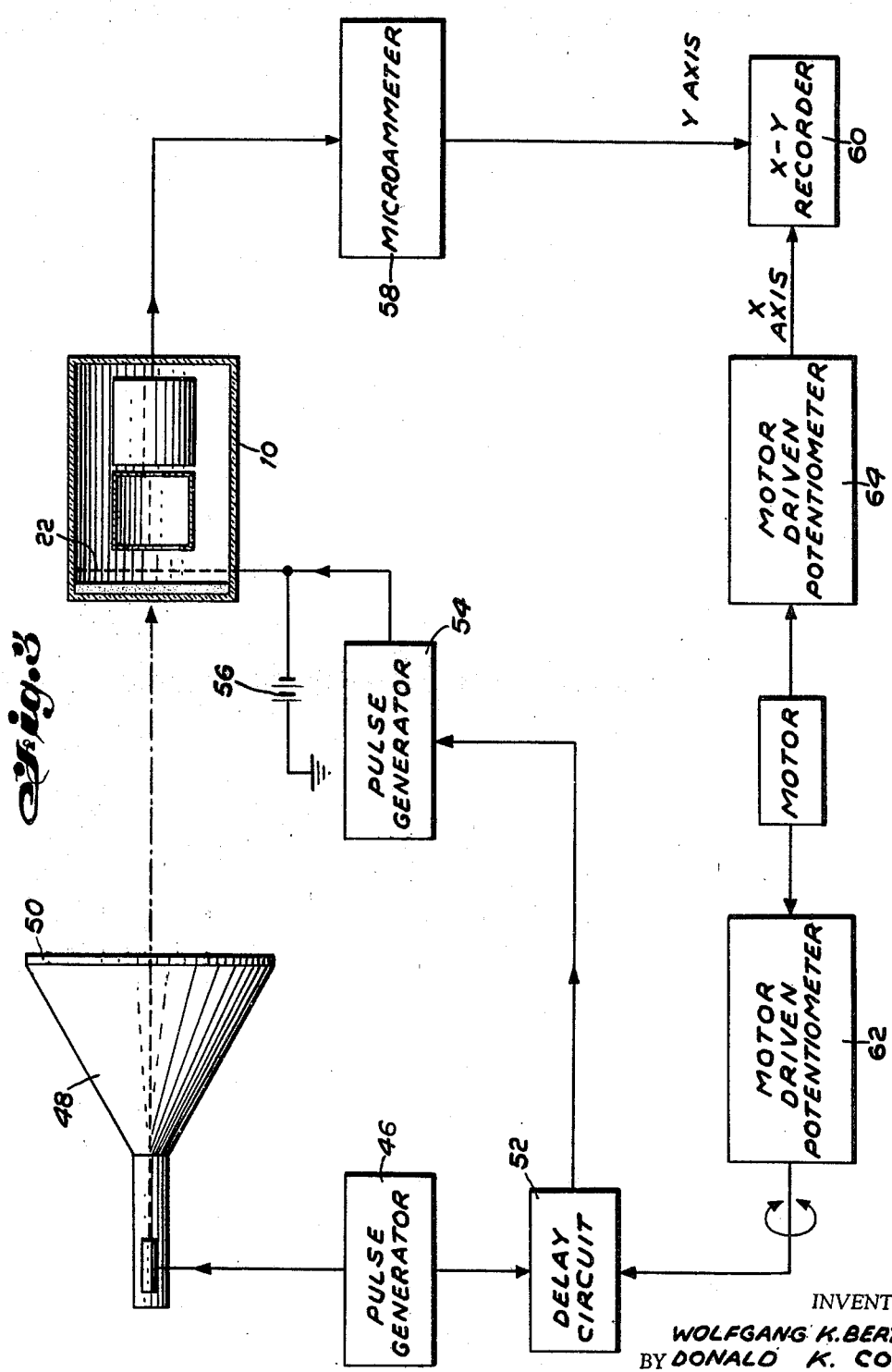

3,498,718
OPTICAL SIGNAL CORRELATION DEVICE
Wolfgang K. Berthold, Donald K. Coles, and Thomas E. Sisneros, Fort Wayne, Ind., assignors to International Telephone and Telegraph Corporation, Nutley, N.J., a corporation of Maryland
Filed Oct. 4, 1966, Ser. No. 584,213
Int. Cl. G01c 3/08
U.S. Cl. 356—5                                   8 Claims

ABSTRACT OF THE DISCLOSURE

A light beam modulated by a first signal is applied to a photocathode of a photomultiplier tube and an electrical signal having a time related difference with respect to the first signal is applied to an adjacent parallel control grid, with the output signal varying in accordance with the time related difference between the two signals.

---

This invention relates to a device for comparing optical and electrical signals related in time and particularly to a grid controlled photomultiplier tube system which provides an output signal directly dependent on the time relation between the optical and electrical signal inputs.

In many situations it is desirable to compare an optical signal carried by a modulated beam of light such as a laser beam with an electrical signal having a time relationship therewith. Such comparisons are useful for example, in optical radar systems to determine the distance to a target, aerial surveying systems and in measuring very short decay times of luminescent materials. Prior art systems for obtaining these results require more complex arrangements wherein the optical signal is first converted by a standard photomultiplier tube into an electrical signal for comparison in other separate external circuits. The transit time and high voltage requirements of the standard photomultiplier generally limit the measuring capabilities of such devices.

It is therefore the primary object of the present invention to provide a simplified and improved device for comparing optical and electrical signals utilizing a grid controlled photomultiplier tube having an output signal directly dependent upon the time relation between the two input signals.

It is another object to provide an optical signal correlation device utilizing a grid controlled photomultiplier which requires only small control voltages and has reduced transit time effects.

These results are achieved by applying the desired electrical comparison signal to a control grid of the photomultiplier adjacent the photocathode to directly affect the beam of electrons produced by the optical signal carrying light beam. In the case of the optical radar system and the luminescent decay measurement, a variable delay circuit is introduced in series with the control grid so that when a maximum output correlation signal is obtained from the combined optical and electrical input signals, a time or distance measurement is provided. In the case of the aerial surveying system, a local oscillator provides a constant frequency electrical signal to the grid having a desired number of cycles different from the optical signal frequency on the photocathode so that after mixing an intermediate or beat frequency output is obtained. The phase delay of the optical signal with respect to the fixed frequency appears at the lower beat frequency and can then be more easily extracted by suitable phase comparison circuitry to provide a measure of distance. The details of the invention will be more fully understood and other objects and advantages will become more apparent in the following description and accompanying drawings, wherein:

FIG. 1 is a schematic diagram of a range finding system utilizing the inventive concept;

FIG. 2 is a block diagram of an aerial surveying system; and

FIG. 3 is a block diagram of a lumiescent decay measuring system.

As shown in FIG. 1 a photomultiplier tube 10 is oriented so that a beam of light 12 originating from a source 14 such as a laser beam is directed at a remote target 16 which reflects the light on to the face of the tube. The light source emits a beam having a time varying light flux or optical signal which is also directed toward a photodiode 18. The diode is connected is connected in series with a variable delay circuit 20 and a control grid or mesh 22 of the photomultiplier. The grid is positioned in close proximity and parallel to a photocathode 24 on the inner face of the tube to directly control the electrons emitted therefrom in response to the reflected optical signal carrying beam. The mesh is preferably biased to control the current from the photocathode in the linear region of the voltage-current characteristic and is driven with the voltage from the photodiode proportional to the optical signal. The current passing the mesh is thus a function of the optical signal on the photocthode and electrical signal on the mesh, with the resultant being amplified in an electron multiplier structure 26 for further processing in a suitable utilization device. Such a device may include an integration circuit such as an RC network to provide an average current over a particular time period.

For use in a range finding device, the photodiode receives the same signal directly as the protocathode receives after reflection. The delay line is adjusted to a delay time corresponding to the time for the light to reach the target and return to the photocathode. This point is indicated by a maximum output current which occurs at the optimum correlation between the cathode and grid signals. The delay time is thus a measure of the distance of the target, assuming that the refractive index of the medium in which the light travels is known. A moving object will cause a change in the optimum correlation which can also be used in known mathematical relationships to measure the speed and determine the direction in which the object is moving. For a simple time varying function like a pulse or sine wave modulated light signal, the optical signal path through the diode to the delay line may be replaced by directly coupling the modulating electrical signal to the delay line and mesh.

As shown in FIG. 2, the grid controlled photomultiplier is positioned for the photocathode 24 to receive a reflected light beam 27 originating from a light source 14 modulated by an optical signal of a predetermined frequency, for example 1500 mc. The phase delay of this signal represents the distance to a particular target position. The grid 22 is fed by a reference electrical signal of 1490 mc. for example, from an amplifier stage 28. The photocathode converts the light signal into an electron beam carrying the 1500 mc. modulation which is then mixed with the 1400 mc. electrical signal on the grid to provide a 10 mc. difference or intermediate frequency component. The mixed signal carrying the phase delay information is amplified in the multiplier structure 26 and fed to a 10 mc. amplifier 30. The photomultiplier output signal of 10 mc. is then compared with a reference 10 mc. signal from a stable local oscillator 32 in a suitable known phase comparator circuit 34. The phase information is then passed through a suitable ambiguity removal circuit 36 to provide the output signal representing the desired distance information.

A second stable local oscillator 38 provides a 1500 mc. signal which is combined in a mixer stage 40 with the output of the 10 mc. ocillator 32 to supply the 1490 mc. reference signal to the control grid. The 1500 mc. signal is also passed through an amplifier 42 and suitable light modulator 44 to light source 14 which directs light beam 12 carrying the 1500 mc. signal toward the desired target, from which it is reflected back toward photomultiplier 10.

For proper distance determination, it is necessary to eliminate ambiguities resulting from the fact that the phase measurement occurs within a 360° cycle and the same phase delay may appear at several different positions along a path including multiple wavelength repetitive sine wave or pulse modulations. This can be accomplished by further modulating the transmitted light at 150 mc., 15 mc. and 1.5 mc., for example, to determine the exact number of decimeters to the distant object. Thus, the 150 mc. modulation, measured to within 0.1 cycle would determine the units digit, the 15 mc. to 0.1 cycle would provide the tens digit and the 1.5 mc. signal to 0.1 cycle provides the hundreds digit. A further discussion of such ambiguity resolving systems may be found on pages 171–4 in the text entitled "Electronic Avigation Engineering" by P. C. Sandretto, published in 1958.

FIG. 3 shows the grid controlled photomultiplier tube utilized in a system for measuring decay times of phosphors. By varying the time relationship between the phosphor excitation pulse and the photomultiplier gating trigger, the entire rise and decay curve is observed. Sharp cut-off characteristics and low capacitance between the photocathode and control mesh make the tube quite efficient for fast switching. A first pulse generator 46 supplies a gating pulse to the control grid of the electron gun of the cathode-ray tube 48 under test. The cathode rap tube electron beam is gated on for a predetermined time to cause luminescence of the test sample phosphor coating 50 on the face plate. A synchronizing pulse from source 46 is passed through a suitable variable delay network 52 such as a known phantastron circuit, to trigger a second pulse generator 54 which applies a pulse to the control grid 22 of photomultiplier 10. A small bias source 56, such as −1 to −2 volts, normally maintains grid 22 in a cut-off condition to prevent conduction of the tube 10, with the high voltage on the tube remaining on. The delayed short duration pulse from source 54, of an amplitude of from +1 to 4 volts, then gates the multiplier on for a desired time to pass the emission current induced by the test phosphor. The output from the multiplier is integrated and measured by a microammeter 58 and recorded on the Y axis of an X–Y recorder 60. The delay circuit 52 is varied continuously by a motor driven potentiometer 62 and the X axis of the recorder is driven by a suitable ramp voltage and a second potentiometer 64 coupled to the same motor. The photomultiplier signal is thus synchronized with the delay time and a full plot of the phosphor emission intensity versus time is obtained.

Use of the present tube and system permit elimination of problems caused by application of high voltage pulses to the anodes or dynodes of standard photomultipliers for gating purposes, as previously required. In addition, the time resolution is now relatively independent of transit time which is negligible between the photo cathode and control grid. This permits direct gating of the control grid by low amplitude short duration pulses to obtain response from fast decay phosphors without more complex sampling techniques.

It may thus be seen that the present invention provides a novel improved system for comparing time related optical and electrical signals. The reduced transit time and voltage requirements of the grid controlled photo-multiplier tube provide a versatile component which operates in a more efficient simplified manner. While several embodiments have been illustrated, it is apparent that the invention is not limited to the exact forms or uses shown and that many other variations may be made in the configuration of the system without departing from the scope of the invention as set forth in the appended claims.

We claim:
1. An optical signal comparison device comprising:
a photomultiplier tube having a photocathode at one end,
a control grid adjacent and parallel to said photocathode,
an electron multiplier at the other end of said tube,
means supplying a first time varying electrical signal,
means applying a light beam modulated by said first time varying signal to said photocathode, said photocathode emitting electrons in response thereto,
means applying a second electrical signal to said control grid having a time related difference with respect to said first signal, and
means deriving an output signal from said electron multiplier varying in accordance with said time related difference between said signals applied to said photocathode and grid.

2. The device of claim 1 wherein said means applying said second electrical signal includes variable time delay means conected in series with said control grid, and
including a light source directing said modulated light beam at a remote target, a portion of said modulated light beam being reflected by said target toward said photocathode, said delay means being adjustable to provide a maximum output signal upon optimum correlation of said first and second signals, the extent of adjustment being dependent upon the distance to said target.

3. The device of claim 2 including means biasing said control grid to provide an output signal linearly proportional to the first and second signals.

4. The device of claim 2 wherein said means applying said second electrical signal includes photosensitive means in series with said delay means and control grid, said light source directing said modulated light beam at said photosensitive means.

5. The device of claim 1 including a light source directing said modulated light beam at a remote target,
a first signal source supplying a first predetermined radio frequency signal,
means modulating said light beam with said first frequency signal, a portion of said modulated light beam being reflected by said target toward said photocathode,
a second signal source supplying a second predetermined radio frequency of a relatively small constant difference with respect to said first frequency,
means applying said second frequency signal to said control grid,
means deriving an output signal having a frequency equal to said difference between said first and second frequencies and having a phase angle dependent upon the distance to said target,
means for comparing said output signal difference frequency with a fixed reference signal at the same frequency to obtain said phase angle, and
means for converting said phase angle into a measure of the distance to said target.

6. The device of claim 1 including luminescent means having a particular light emission response characteristic with respect to time,
first pulse means for energizing said luminescent means to emit a pulse of light, said light being directed at said photocathode,
bias means connected to said control grid to maintain said photomultiplier tube in a normally cut-off condition, second pulse means applying pulses to said control grid to cause said tube to conduct, variable delay means for sychronizing said first and second pulse means to selectively cause conduction at a predetermined portion of said light response characteristic, and means for measuring the output at said portion of said response characterisic.

7. The device of claim 6 including means for automatically varying said delay means over the entire period of said light response characteristic to permit measuring output for said entire response characteristic.

8. The device of claim 7 including means for recording said entire output response characteristic.

References Cited

UNITED STATES PATENTS

| | | | |
|---|---|---|---|
| 3,266,365 | 8/1966 | Stavis | 356—4 |
| 3,278,753 | 10/1966 | Pitts et al. | 250—218 |
| 3,349,231 | 10/1967 | Harmon | 324—77 X |
| 3,388,240 | 6/1968 | Robbins | 343—100.7 X |
| 3,424,531 | 1/1969 | Bender et al. | 356—4 |
| 3,430,092 | 2/1969 | Steiner | 315—10 |

RODNEY D. BENNETT, Primary Examiner

J. P. MORRIS, Assistant Examiner

U.S. Cl. X.R.

315—10